T. R. BROWN.
CAR AND ELECTRIC COUPLING.
APPLICATION FILED JUNE 24, 1916.
1,316,415.
Patented Sept. 16, 1919.
3 SHEETS—SHEET 3.
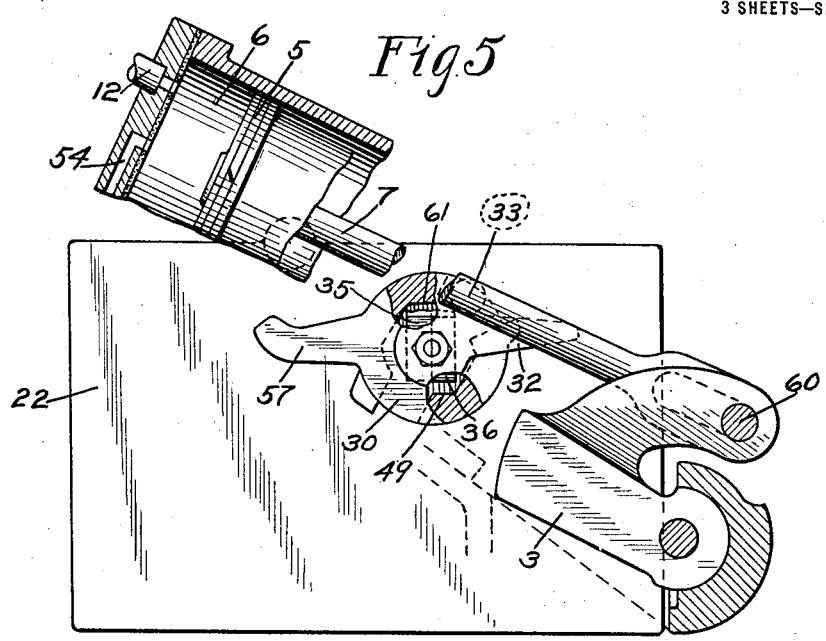
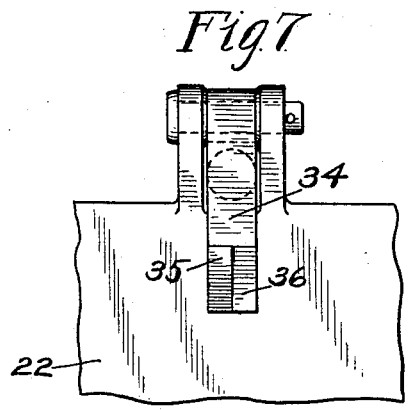
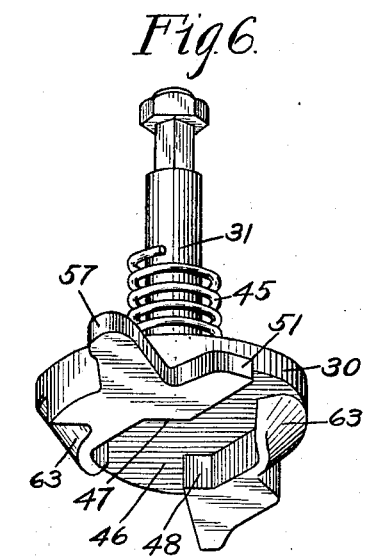
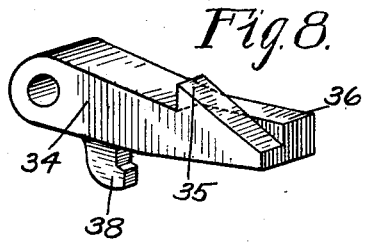
INVENTOR
Thomas R. Brown
By Wm. M. Cady
Att'y.

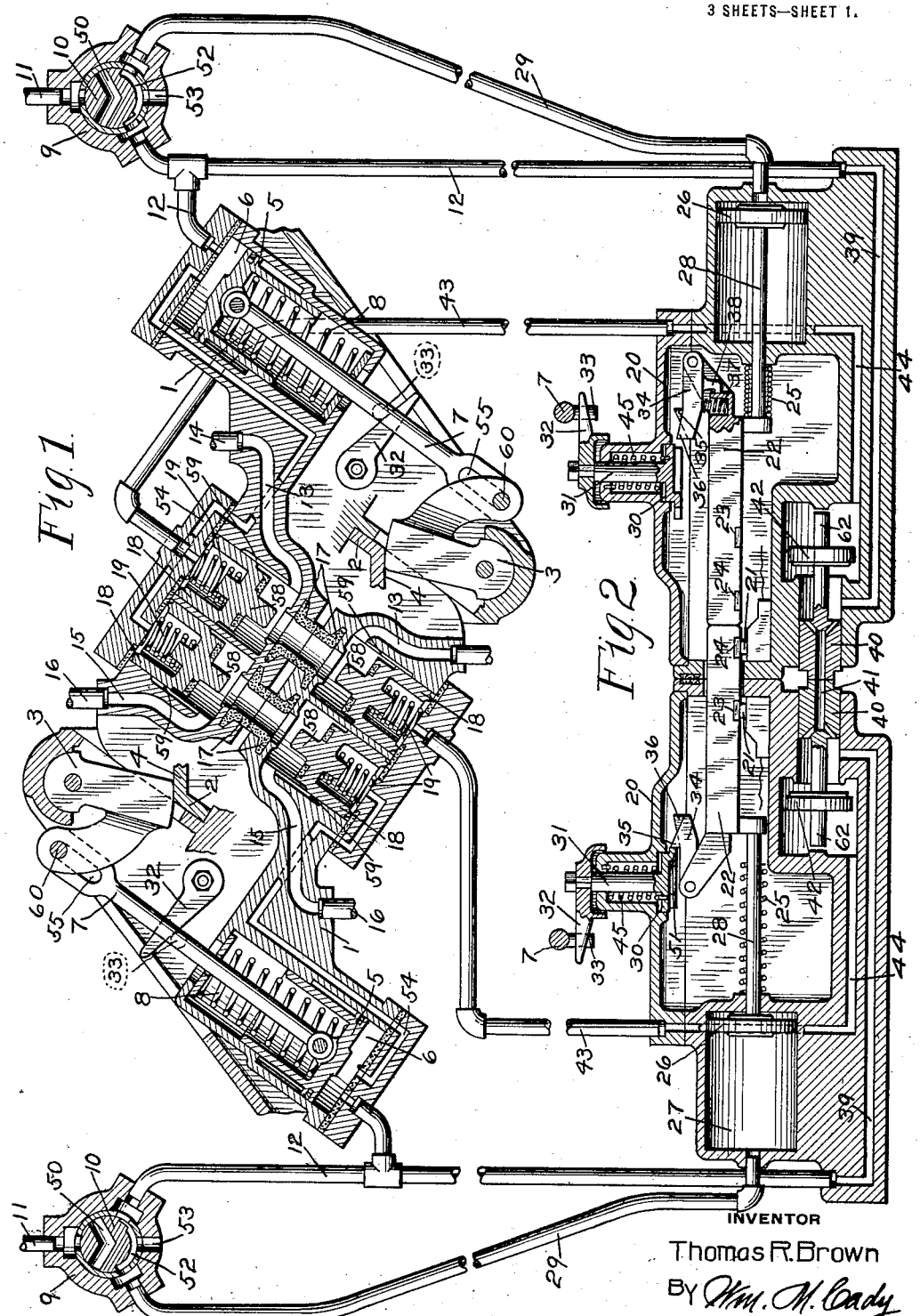

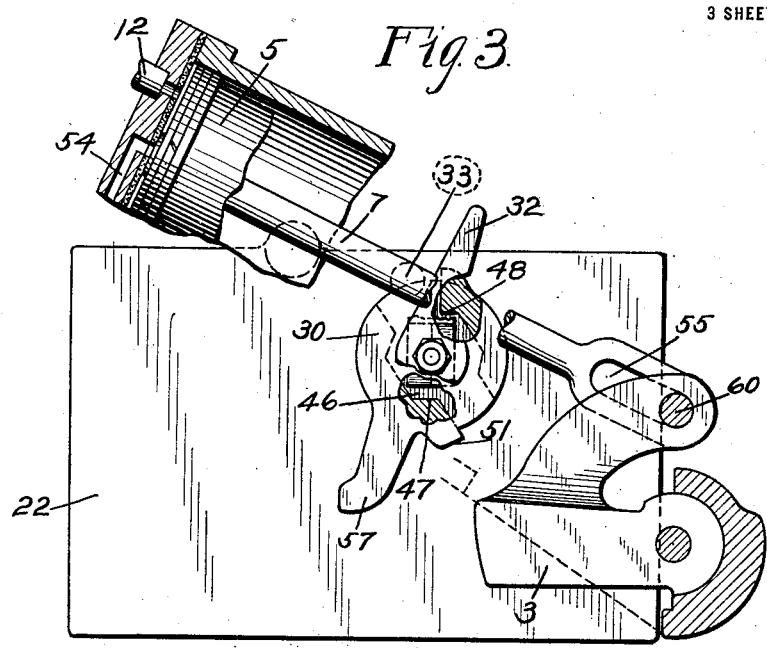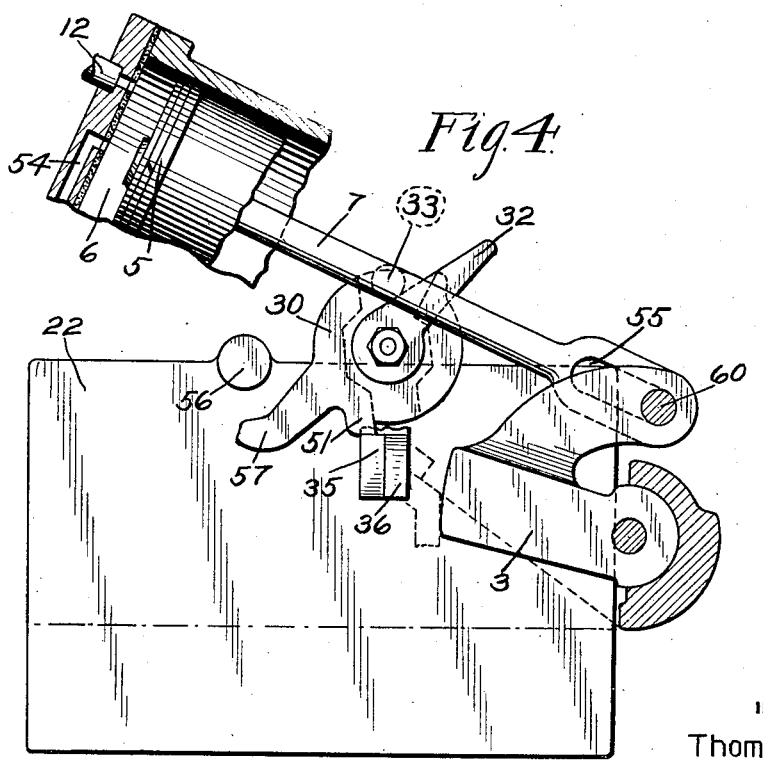

UNITED STATES PATENT OFFICE.

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

CAR AND ELECTRIC COUPLING.

1,316,415.  Specification of Letters Patent.  Patented Sept. 16, 1919.

Application filed June 24, 1916. Serial No. 105,736.

*To all whom it may concern:*

Be it known that I, THOMAS R. BROWN, a citizen of the United States, residing at Sparkill, in the county of Rockland and State of New York, have invented new and useful Improvements in Car and Electric Couplings, of which the following is a specification.

This invention relates to car couplers having one or more train pipe passages adapted to be connected with corresponding passages in a counterpart coupler and also to means for connecting electric train line circuits between the cars of a train.

It has heretofore been proposed to employ a movable contact carrier which is adapted to be projected into the contact carrier casing of a counterpart coupler for connecting of the electric train line circuits between the cars and particularly where such a construction is employed in connection with a car coupler of the type adapted to uncouple by a lateral as well as a longitudinal movement, it is highly important to insure that the contact carrier will be retracted out of the counterpart carrier casing before the coupler heads are separated, as otherwise the carriers are liable to be broken or damaged upon separation of the cars.

One object of my invention is therefore to provide means positively controlled by the movement of the coupler lock releasing device for insuring the movement of the contact carrier to release position before the coupler locks can be released.

It is also desirable to prevent the projection of the contact carrier until the couplers have been securely locked together, since otherwise the couplers might be brought together and the contact carrier projected without having one or possibly both of the coupler locks move to the locked position, and furthermore the contact carrier might be projected before the couplers are brought together so that the projected contact carrier would not be in proper alinement for coupling, and the contact carrier might then be damaged by engagement with some part of the counterpart coupler. Furthermore, it would obviously be undesirable to connect up the electric train line circuits for supplying power for running the car until the couplers have been properly locked together.

Another object of my invention is therefore to provide means for preventing the throwing of a contact carrier until the counterpart couplers have been locked together.

Another object of my invention is to provide a car coupler having one or more train pipe passages with valves for controlling said passages and improved means for controlling the operation of said valves.

Various other objects and advantages will appear in the following more detailed description of the invention.

In the accompanying drawings; Figure 1 is a diagrammatic horizontal section of a pair of the improved car, air, and electric couplers in the coupled position, omitting certain parts; Fig. 2 a diagrammatic vertical section thereof, in part, showing the movable electric contact carrier portion; Fig. 3 a view, partly in section, of the coupler locking mechanism, the contact carrier, and the interlock, showing the parts in position when not coupled up; Fig. 4 a similar view, with the parts in coupled position; Fig. 5 a similar view, showing the parts in a position before the coupler lock moves to coupled position; Fig. 6 an isometric projection of one of the interlock members; Fig. 7 a plan view of a portion of the contact carrier showing the interlock pawl applied thereto; and Fig. 8 an isometric projection of the interlock pawl.

As shown in the drawings, the coupler may comprise a main casting 1 having a projection 2 with a vertical plane surface inclined at an angle to the line of draft and adapted to engage and interlock with a corresponding surface on the projection 2 of a counterpart coupler in coupling.

Each coupler head is provided with a pivoted lock 3 adapted to bear against a locking surface 4, on the outer side of the projection 2 of the counterpart coupler head, and hold the couplers securely clamped together when in the coupled position.

In order to provide for releasing the lock, a fluid operated piston 5, contained in cylinder 6, is connected to the lock 3 by a rod 7, a spring 8 acting on piston 5 in a direction tending to hold the lock in its locking position. Fluid under pressure is admitted to the piston 5 by means of a cock 9 having a plug valve 10 for connecting pipe 11, leading to a source of fluid pressure to a pipe 12 leading to piston cylinder 6.

For the purpose of establishing a connection for train pipe lines through the coupler, one or more passages may be provided in the coupler head, such as passage 13 leading to train brake pipe 14 and passage 15, leading to a main reservoir or other source of supply pipe 16.

It will be understood that while for convenience in describing, the train pipe passages are shown in a horizontal plane, in the actual construction these passages are arranged in a vertical plane.

Mounted at the open end of each passage is a gasket 17 adapted to engage a corresponding gasket on the counterpart coupler as the couplers come together.

In order to provide for opening and closing the passages automatically as the couplers come together and as they separate, one feature of my invention consists, as will be hereinafter more fully explained, in employing double seating valve pistons 18, each subject to the pressure of a spring 19, tending to seat the valve piston at its outer seat, so as to prevent the escape of fluid from the train pipe lines when the couplers are separated.

The electric contact device may comprise a casing 20 supported beneath the under side of the coupler head in such position that the adjacent ends of the two casings meet together when coupled. In the casing 20 there is provided a horizontal row of contact fingers 21 each connected to a corresponding train line circuit and in order to establish electrical connection between the respective contact fingers of the counterpart coupler, a movable contact carrier 22 is employed which is provided with rows of connected contacts 23 and 24, adapted to engage the contact fingers 21 when the couplers are coupled together and one of the contact carriers is projected into the casing of the counterpart coupler.

Suitable springs, indicated diagrammatically in the drawings by the spring 25, are provided for throwing the contact carrier to normal release position, and in order to operate the contact carrier, there is provided a piston 26 contained in cylinder 27 and operatively connected by rod 28 to the contact carrier. Fluid for operating piston 26 is supplied to cylinder 27 through a pipe 29 connected to cock 9.

According to one feature of my invention, means are provided for positively insuring that the movable contact carrier will not be projected until both the coupler locks have been moved to the locked position, in the act of coupling; and that the contact carrier will be retracted before the coupler heads can be unlocked and the couplers separated.

A preferred construction for the above purpose is shown in the drawings, comprising a rotatable locking member 30 provided with a stem 31 carrying a lever 32 adapted to be engaged by a projecting finger 33 on the piston rod 7. The locking member 30 extends into the contact carrier casing 20 and coöperates with a pawl lever 34, pivotally mounted on the carrier 22 and having pawls 35 and 36 facing in opposite directions. A spring 37 tends to yieldingly maintain the lever 34 in its upper position and a stop 38, engaging a portion of the carrier 22, limits the upward movement thereof.

In order to release both locks of two counterpart couplers when it is desired to uncouple the cars, a fluid conduit 39 is provided in the contact carrier casing 20 which communicates with the corresponding passage 39 of a counterpart coupler through abutting tappets 40 adapted to act as pistons and having a central aperture 41 adapted to register with the aperture in the corresponding tappet of the counterpart coupler and communicating with the conduit 39.

The tappet 40 carries a puppet valve 42 for controlling communication through pipe 43 and a passage 44 from the spring side of the brake pipe closing valve 18 to the tappet 40.

In operation, when the car is standing uncoupled, the coupler lock is in the position shown in Fig. 3 of the drawings, the spring 8 acting on the release piston 5 through rod 7 to hold the lock 3 in the position shown. The interlock member is held in the position shown by the action of a torsional spring 45 and the contact carrier 22 being in neutral or normal release position, the pawls 35 and 36 engage within a recess 46 formed in the under side of the interlock member 30.

In this position, a ledge 47 of the interlock member is interposed in the path of the pawl 36, so that the pawl by engagement with the ledge will prevent outward movement of the contact carrier 22. In this position, however, the contact carrier may be thrown back for inspection and repairs, for although there is a rear ledge 48 in the path of the pawl 36, the pawl being in the form of an incline, can be depressed by the ledge, permitting the pawl to ride under the ledge.

If it is desired to couple up two cars, they are brought together, causing the coupler projections 2 of the counterpart couplers to interlock by a relative lateral movement and when the projections are in the coupled position, the locks 3, which were forced outwardly to the position shown in Fig. 5, by the coming together of the couplers, snap back, so that each lock engages the locking surface 4 of the opposite coupler.

As hereinbefore stated, the contact carrier 22 cannot move out in normal release position of the parts and is also prevented from moving outwardly when the cars are being coupled, since, as shown in Fig. 5, a ledge 49 is interposed in the path of the pawl 36, by the rotation of the interlock member 30 which is effected through the engagement of the projection 33 with lever 32, the rod 7 being pulled outwardly by the movement of the lock 3.

The ledge 49 is so positioned, that when the lock 3 moves toward locking position, the retractive movement of the member 30 by the spring 45 will not release the pawl 36 from engagement with ledge 49 until the lock 3 has engaged the locking surface 4 to a certain minimum degree, insuring the tight locking of the couplers.

In a similar manner, the contact carrier is prevented from rearward movement by engagement of pawl 35 with ledge 61, so that unless both locks move to locked position, the contact carrier cannot be projected. When this point is reached, however, the pawl 36 is free to move forward. While the ledge 47 may be in the path of pawl 35, this will not prevent movement because the pawl is inclined, so that the same can ride under the ledge.

When the couplers are coupled up, one of the plug valves 10 is turned so as to connect pipe 29 through a passage 50 with supply pipe 11. Fluid under pressure is then admitted to piston chamber 27 and the corresponding piston 26 is forced outwardly, projecting the contact carrier 22 into the carrier casing of the opposite car where the same engages the opposing contact carrier and forces the same rearwardly as shown in Fig. 2 of the drawings.

The projected contact carrier then connects the corresponding train line circuits through the engagement of contacts 23 and 24 with the fingers 21.

When the projected contact carrier attains its final position, the pawl 35 which has passed under the ledge 47 is moved to normal position by the spring 37 and engages back of a projection 51, as shown in Fig. 2, thus locking the contact carriers in the coupled position.

The plug valve 10 is now turned to normal running position, as shown in Fig. 1, in which pipe 29 is connected through a groove 52 with an exhaust port 53 and pipe 12 is connected through a restricted portion of the cavity with said exhaust port.

The engagement of the tappets 40 lifts the corresponding valve 42 from its seat, so that fluid is vented from the brake pipe closing valve 18 through pipe 43, passage 44, past the valve 42, to passage 39 and pipe 12, which is open to exhaust port 53. Brake pipe pressure then acting on the face of valve 18 therefore shifts the valve to open position where it is held seated.

The spring side of main reservoir closing valve 18 at the left of Fig. 1, is also connected to the exhaust through passage 54 which opens into the locking cylinder 6, so that main reservoir pressure acting on the face of the valve forces the same to open position.

It will be seen that should any leakage occur past the closing valves, no pressure can be built up on the locking pistons or on the contact carrier pistons since the same are open to the exhaust port 53 of the controlling cocks.

If it is desired to uncouple the cars, one of the plug valves 10 is turned to the uncoupling position, in which port 50 connects pipe 11 with pipe 12. Fluid is thereupon supplied to piston cylinder 6 on the corresponding car and also flows through passage 39 and the registering tappets 40 to passage 39 in the carrier casing of the counterpart coupler, so that fluid is supplied to both piston cylinders 6 of the connected couplers.

The pin connection 60 of the lock 3 works in an elongated slot 55 in the rod 7, so that during the initial movement of piston 5, the lock 3 will not be shifted. This initial movement of the rod 7, however, operates to turn the lever 32 and thus rotate the interlock member 30, so that the ledge 51 is turned out of the path of the pawl 35. As soon as this occurs, the spring 25, which is under compression in the coupler containing the retracted contact carrier, operates to shift the carriers to neutral or release position.

The lost motion in slot 55 having been taken up, the further movement of piston 5 in each coupler operates the lock 3, shifting the same to the uncoupled position, and permitting the separation of the couplers in the usual manner.

Provision is made, in case the contact carriers should stick and the springs 25 fail to shift same to neutral position, for positively moving the contact carriers by providing a projection 56 on the contact carrier and a projecting arm 57 on the inter-lock member 30, so positioned that as the member 30 is rotated by the movement of the rod 7, the arm 57 will engage the projection 56 on the carrier and thus force the carrier to neutral position.

It will now be evident that the coupler locks cannot be released until the contact carriers have been shifted to neutral position, thus preventing possible damage to the contact carriers when the couplers are separated.

The meeting face of the tappet 40 is preferably of less area than the piston portion thereof, so that if the tappets should possibly be slightly jarred apart when the cars are running coupled up, as soon as fluid pressure is supplied to passage 39 in effecting the uncoupling operation, the pressure acting on the inner face of the tappet will be sure to promptly move the tappet to engagement with the opposite tappet.

The tappet is also provided with a rearwardly projecting portion 62, adapted to engage a wall of the carrier casing 20 upon a very slight movement from the normal position, when the parts are coupled together, so that only a slight opening at the meeting faces of the tappets can be brought about, even if the tappets should jar apart.

When fluid is admitted to the releasing cylinders 6, air also flows through passage 44 to the spring side of the brake pipe closing valve 18 on each coupler, the valves 42 being held off their respective seats by the engagement of the tappets 40, and the fluid pressures on opposite sides of the closing valves being thus equalized, the respective springs 19 effect the closure of the valves. Similarly, fluid is supplied from the piston cylinder 6 on each coupler through passage 54 to the spring side of the supply pipe closing valve 18, so that these valves are also closed by their respective springs. It will therefore be seen that when the counterpart couplers are separated, no fluid can escape either from the supply pipe or the brake pipe.

While the pipe 12 is open to the exhaust port 53 in running position, so as to permit the escape of possible leakage past the closing valves and thus prevent the building up of pressure on same, tending to close the valves, the cavity 52 is restricted at its connection with pipe 12, so that when fluid is supplied to the pistons 5 for the purpose of uncoupling, the escape of fluid at the exhaust port 53 will be so slight, that the building up of pressure for operating the piston 5 will not be prevented.

In order to prevent possible entrance of dirt and moisture, the closing valves 18 may be provided with projecting portions 58 adapted to practically fill the port opening at the gasket faces of the conduits when the valves are in closed position. A leakage groove 59 is provided around each closing valve, which is open in the closed position of the valve, so that when the couplers are separated, and the valves 42 are seated, the fluid pressure on the spring side of the brake pipe closing valves will be maintained from the brake pipe, while the fluid pressure on the spring side of the main valve closing valve will be maintained from the main valve pipe by the seating of piston 5, as shown in Fig. 3, so as to close the port opening of passage 54, the piston being thrown to this position by the spring 8, when the couplers are separated.

In case of accidental parting of the couplers, as when a train breaks in two, since fluid under pressure is not supplied to the spring side of the brake pipe closing valves, these valves will remain open and thus permit the venting of fluid from the brake pipe so as to cause an automatic emergency application of the brakes in the usual manner.

The interlock member 30 preferably has its projecting ledge portions rounded off as shown at 63, so that in case the pawls 35 and 36 should not happen to be in the proper position within recess 47, the member 30 can still be rotated, since the rounded portion 63 can force the pawls down and out of the way.

Having now described my invention, what I claim as new and desire to secure by Letters Patent, is:

1. In a car coupler, the combination with a coupler head, a movable lock, a device for releasing said lock, and a movable contact carrier adapted to be projected into a counterpart coupler, of means controlled by said releasing device for locking the contact carrier in its projected position.

2. In a car coupler, the combination with a coupler head, a movable lock, a device for releasing said lock, and a movable contact carrier adapted to be projected into a counterpart coupler, of means for locking the contact carrier in its projected position and operated by said releasing device for effecting the release of the contact carrier.

3. In a car coupler, the combination with a coupler head, a movable lock, a device for releasing said lock, and a movable contact carrier adapted to be projected into a counterpart coupler, of means for locking the contact carrier in its projected position and adapted to be operated by said releasing device before the coupler lock is released for effecting the release of the contact carrier.

4. In a car coupler, the combination with a coupler head, a movable lock, a fluid pressure device for releasing said lock, electrical contacts connected to train line circuits, a movable carrier having corresponding contact bars, and means for projecting said carrier to electrically connect corresponding contacts of counterpart couplers, of an interlock mechanism for holding the contact carrier in its projected position and adapted to be actuated by the initial movement of said releasing device before the coupler lock is actuated for effecting the release of the contact carrier.

5. In a car coupler, the combination with a coupler head, a movable lock, a device for releasing the lock and having a movement relative thereto, and a movable electric contact carrier adapted to be projected for connecting electric train line circuits, of means for locking the contact carrier in its projected position and adapted to be operated by the relative movement of said releasing device for permitting the return of the projected contact carrier to release position.

6. In a car coupler, the combination with a coupler head, a movable lock, a device for releasing the lock, and a movable electric contact carrier adapted to be projected for connecting electric train line circuits, of an interlock for preventing movement of said contact carrier to its projected position and adapted to be operated upon movement of the coupler lock to its coupled position to permit the projection of said carrier.

7. In a car coupler, the combination with a coupler head, a movable lock, a device for releasing the lock, and a movable electric contact carrier adapted to be projected for connecting electric train line circuits, of an interlock for preventing movement of said contact carrier to its projected position and adapted to release said carrier upon movement of said releasing device and the coupler lock to the locked position.

8. In a car coupler, the combination with a coupler head, a movable lock, a device for releasing the lock, and a movable electric contact carrier adapted to be projected for connecting electric train line circuits, of interlocking means for preventing movement of said contact carrier to its projected position until the coupler lock has moved substantially to coupled position.

9. In a car coupler, the combination with a coupler head, a movable lock, a device for releasing said lock, and a movable electric contact carrier adapted to be projected for connecting electric train line circuits, of interlocking means for preventing the release of the coupler lock until the contact carrier is released from its projected position and for preventing the projection of the contact carrier until the coupler lock has moved to coupled position.

10. In a car coupler, the combination with a coupler head, a movable lock, a device for releasing said lock, and a movable electric contact carrier adapted to be projected for connecting electric train line circuits, of an operative connection between the releasing device and the contact carrier for positively moving the contact carrier from its projected position in the act of effecting the release of the coupler lock.

11. In a car coupler, the combination with a coupler head, a movable lock, a device for releasing said lock, and a movable electric contact carrier adapted to be projected for connecting electric train line circuits, of a mechanically operated connection between the releasing device and the contact carrier for positively moving the contact carrier from its projected position to release position upon movement of the releasing device to effect the release of the coupler lock.

12. In a car coupler, the combination with a coupler head, a movable lock, a device for releasing said lock, a movable electric contact carrier adapted to be projected for connecting electric train line circuits, and means for normally returning the contact carrier to release position, of an interlock for holding the contact carrier in its projected position and adapted to be actuated by the initial movement of the coupler lock releasing device in the act of releasing the lock for permitting the release movement of the contact carrier and means operated by the movement of the interlock for mechanically shifting the carrier to release position in case the carrier fails to move otherwise.

13. In a car coupler, the combination with a coupler head containing a train pipe passage adapted to be connected with a corresponding passage in a counterpart coupler head, a movable lock, and a fluid pressure operated device for releasing said lock, of a valve operated by fluid pressure supplied to said releasing device for closing said passage and a valve operated by the coming together of the couplers for releasing fluid from said passage controlling valve to operate same and open said passage.

14. In a car coupler, the combination with a coupler head containing a train pipe passage adapted to be connected with a corresponding passage in a counterpart coupler head, a movable lock, and a fluid pressure operated device for releasing said lock, of a valve operated by fluid pressure supplied to said releasing device for closing said passage and a valve adapted to close upon separation of the couplers and prevent the release of fluid from said passage controlling valve.

15. In a car coupler, the combination with a coupler head containing a train pipe passage adapted to be connected with a corresponding passage in a counterpart coupler head, a movable lock, and a fluid pressure operated device for releasing said lock, of a valve operated by fluid pressure supplied to said releasing device for closing said passage, a valve for controlling the release of fluid from said passage controlling valve, and a tappet adapted to abut against a corresponding tappet of a counterpart coupler for holding said releasing valve open when the couplers are connected together and adapted to permit said valve to close upon separation of the couplers.

16. In a car coupler, the combination with a coupler head containing a train pipe passage adapted to be connected with a corresponding passage in a counterpart coupler head, a movable lock, and a fluid pressure operated piston for releasing said lock, of a valve for controlling said passage and a passage for admitting fluid supplied to said piston to said valve for closing same.

17. In a car coupler, the combination with a coupler head containing a train pipe passage adapted to be connected with a corresponding passage in a counterpart coupler head, a movable lock, and a fluid pressure operated piston for releasing said lock, of a valve for controlling said passage and a passage for admitting fluid supplied to said piston to said valve, said passage being closed by said piston upon movement to release position.

18. In a car coupler, the combination with a coupler head containing a train pipe passage adapted to be connected with a corresponding passage in a counterpart coupler head, a movable lock, a cylinder, and a piston therein operated by fluid pressure for releasing said lock, of a valve for controlling said train pipe passage and a passage connecting said piston cylinder with said valve and adapted to be closed by said piston upon movement to release position.

19. In a car coupler, the combination with a coupler head, a movable lock, and a fluid pressure operated device for releasing said lock, of a tappet adapted to engage a corresponding tappet of a counterpart coupler and having a passage for establishing communication between the fluid pressure operated devices of counterpart couplers, the meeting face of the tappet having a reduced area.

20. In a car coupler, the combination with a coupler head, a movable lock, and a fluid pressure operated device for releasing said lock, of a tappet adapted to engage a corresponding tappet of a counterpart coupler and having a passage for establishing communication between the fluid pressure operated devices of counterpart couplers, and means adapted in the coupled position for limiting the movement of the tappet to a minimum.

21. In a car coupler, the combination with a coupler head containing a train pipe passage adapted to be connected with a corresponding passage in a counterpart coupler head, of a valve for controlling said passage having a projecting portion adapted to substantially fill the outlet port of said passage when the valve is closed.

In testimony whereof I have hereunto set my hand.

THOMAS R. BROWN.